Patented Aug. 5, 1924.

1,503,956

UNITED STATES PATENT OFFICE.

HARRY W. KLINGER, OF KENVIL, NEW JERSEY, ASSIGNOR TO HERCULES POWDER COMPANY, OF WILMINGTON, DELAWARE, A CORPORATION OF DELAWARE.

EXPLOSIVE AND PROCESS OF MAKING SAME.

No Drawing. Application filed May 19, 1922. Serial No. 562,141.

*To all whom it may concern:*

Be it known that I, HARRY W. KLINGER, a citizen of the United States, residing at Kenvil, county of Morris, and State of New Jersey, have invented a new and useful Improvement in Explosives and Processes of Making Same, of which the following is a full, clear, and exact description, reference being had to the accompanying drawings, which form a part of this specification.

My invention relates to an improved method of preparing a highly stable nitro starch explosive whereby such an explosive may be manufactured at a minimum cost and will be safe and advantageous for commercial use. Nitrated starch is well known as an explosive, but its use is restricted because of the high cost of its manufacture, unless the manufacturer be especially equipped for acid recovery, due to the difficulty of separating the nitro starch from the spent acids used in nitrating it.

Now the object of my invention is to effect the nitration of starch in such a manner as to permit of ready recovery of the spent acids and ready stabilization of the nitrated starch and at the same time to produce an explosive which will be highly efficient and safe for commercial use.

I have discovered that if starch be dissolved in glycerine and the solution nitrated the acids used in the nitration process will readily separate from the nitrated solution and may be readily recovered. Further, the nitrated starch in the solution may be readily stabilized by treatment of the solution with an alkali.

In carrying out my invention in general I proceed as follows: A quantity of starch, say from about 10 parts to 30 parts is added to a quantity of glycerine, say from about 90 parts to 70 parts and to the mixture of starch and glycerine is added an acid, such as, for example, hydrochloric or sulfuric acid, to an amount by weight not exceeding about three per cent (3.0%) of the weight of the glycerine.

The mixture of starch, glycerine and acid is then treated at a temperature of not exceeding about 220° F. for such a length of time as is required for the starch to become converted into its soluble form and dissolve in the glycerine.

The solution of starch and glycerine is then nitrated by a mixture of nitric and sulfuric acids in the usual manner. When nitration is complete, the nitrated solution is allowed to stand, permitting the spent acid to separate by gravity. The acids are then drawn off, the nitro-starch-nitroglycerine solution washed with water to remove the bulk of the dissolved acids, and treated with an alkali, such as sodium carbonate, sodium bicarbonate, or sodium hydroxid, in water, in order to purify it, the alkali solution at the same time acting to stabilize the nitrated starch.

As an example of the method of producing the explosive in accordance with my invention, the following is typical, it being understood that I do not limit myself to the proportions of ingredients, temperatures, or particular steps set out, as they may be varied by those skilled in the art:

I add 15 parts of ordinary starch to 85 parts of glycerine, preferably of the grade known as dynamite glycerine. To the mixture of starch and glycerine, I add ½ parts of hydrochloric acid and subject the mixture to a temperature of 220° F. for a period of about six hours. The heat and acid cause the starch to become converted into its soluble form and it goes into solution in the glycerine.

When the starch is dissolved, about 20 parts of the solution are introduced into a nitrator and nitrated with about 100 parts of mixed acids of the approximate composition: nitric acid 49%, sulfuric acid 51%.

On completion of the nitration to the desired degreee, the nitrated solution is withdrawn from the nitrator and the spent acids allowed to settle out. After settlement of the spent acids, they are drawn off and the nitrated solution washed with water at a temperature of about 115° F. to remove the bulk of the dissolved acids. The nitrated solution is then purified and stabilized by washing with a 3% solution of sodium carbonate in water at a temperature of about 115° F.

While I have given a specific example for the carrying out of my invention, I do not limit myself to the specific proportions of ingredients, temperatures or steps set out. I may use glycol or a mixture of glycols, for example, instead of glycerine, and where herein I refer to glycerine, I mean to include glycols. I may use acids of varying strengths, either anhydrous or containing water, in either the preliminary treatment of the starch or in the nitrating process. I may use different proportions of glycerine and acids, and different alkali agents, in different strengths of solutions, and the temperatures of treatment may be varied.

Nor would my invention be departed from if some ingredient not specified, as, for example, sugar, were incorporated in the composition, either in suspension or solution.

Having now fully described my invention, what I claim and desire to protect by Letters Patent is:

1. The process comprising treating a mixture of starch and glycerine to convert the starch into a derivative soluble in the glycerine, and nitrating the solution formed.

2. The process comprising mixing starch and glycerine, treating the mixture to convert the starch into a product soluble in the glycerine, nitrating the solution formed, removing the spent acid, and stabilizing the nitrated solution.

3. The process comprising treating a mixture of starch and glycerine with a mineral acid to form a solution, nitrating the solution formed, removing the spent acid and stabilizing the nitrated solution.

4. The process comprising treating a mixture of starch and glycerine with a mineral acid in the presence of heat to form a solution, nitrating the solution formed, removing the spent acid, and stabilizing the nitrated solution.

5. The process comprising hydrolyzing a mixture of starch and glycerine to form a solution, nitrating the solution formed, removing the spent acid, and stabilizing the mixture.

6. The process comprising treating a mechanical mixture of starch, relatively insoluble in glycerine, and glycerine to form a solution, and nitrating the solution formed.

7. The process comprising mixing starch, relatively insoluble in glycerine, with glycerine, introducing a mineral acid into the mixture and treating to form a solution, nitrating the solution formed, removing the bulk of the spent acid by decantation, washing with water to remove the last traces of the spent acid, removing the wash water, and treating with an alkali solution to stabilize the nitrated solution.

8. The process comprising mixing starch with glycerine, adding to the mixture a mineral acid in amount by weight not in excess of three per cent of the weight of the glycerine, heating the mixture to effect the formation of a solution, nitrating the solution formed, removing the spent acid and stabilizing the nitrated solution.

9. The process comprising mixing starch and glycerine, treating the mixture with a mineral acid to form a solution, adding sugar to the solution, nitrating the solution formed and treating the resultant to stabilize it.

10. The process comprising treating a mixture of starch and glycerine with a mineral acid in the presence of heat, nitrating and stabilizing.

11. An explosive containing nitrated glycerine and a nitrated product in solution in the glycerine, said product being formed before nitrating by treating starch in admixture with glycerine to form a solution, the whole being stabilized.

12. An explosive containing nitrated glycerine and a nitrated product in solution in the glycerine, said product being formed before nitrating by treating starch in admixture with the glycerine with a mineral acid, the whole being stabilized.

13. An explosive containing nitrated glycerine, nitrated sugar and a nitrated product in solution in the glycerine, said product being formed before nitration by treating starch in admixture with the glycerine with a mineral acid, the whole being stabilized.

In testimony of which invention, I have hereunto set my hand, at Kenvil, New Jersey, on this 9th day of May, 1922.

HARRY W. KLINGER.